United States Patent Office 3,503,489
Patented Mar. 31, 1970

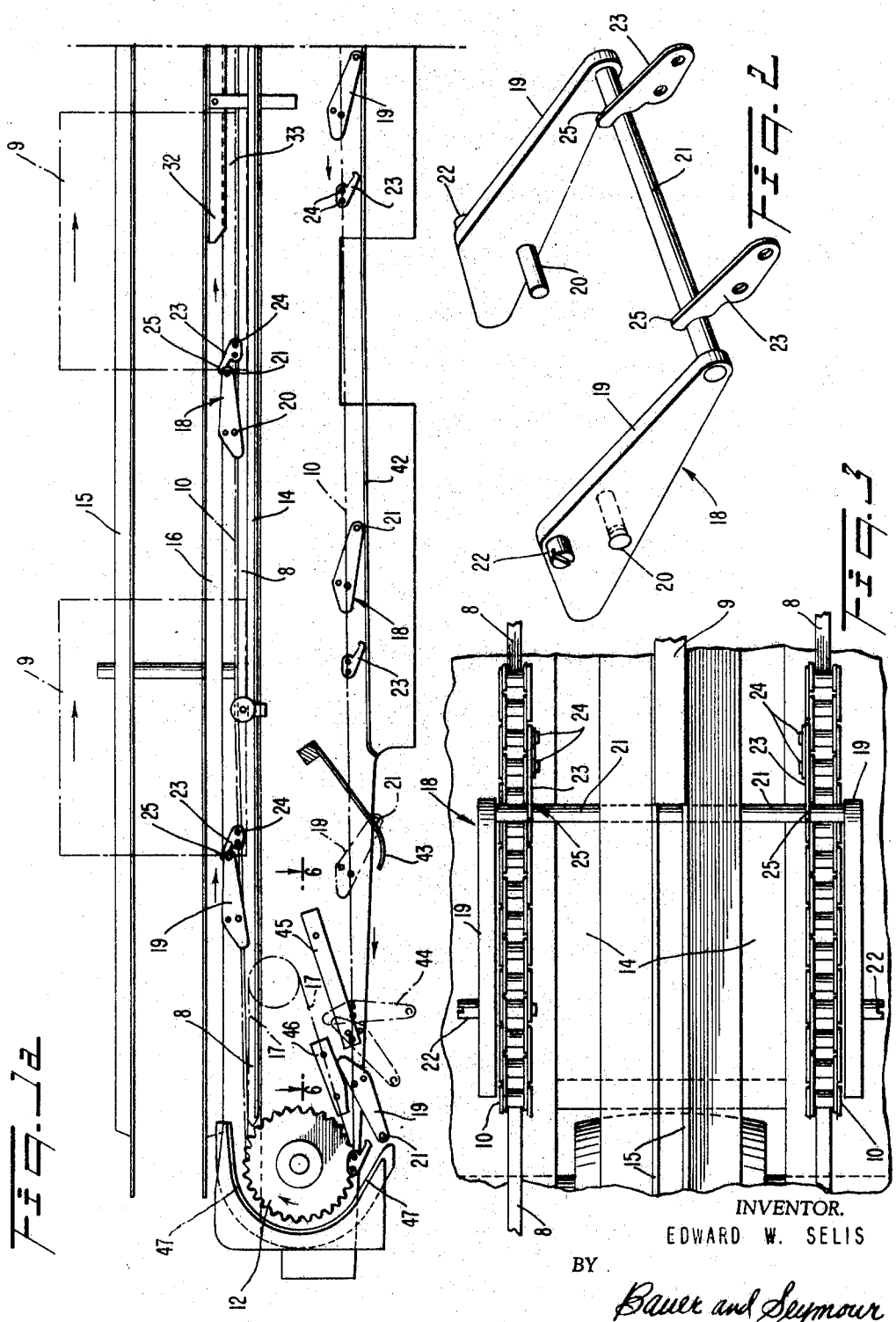

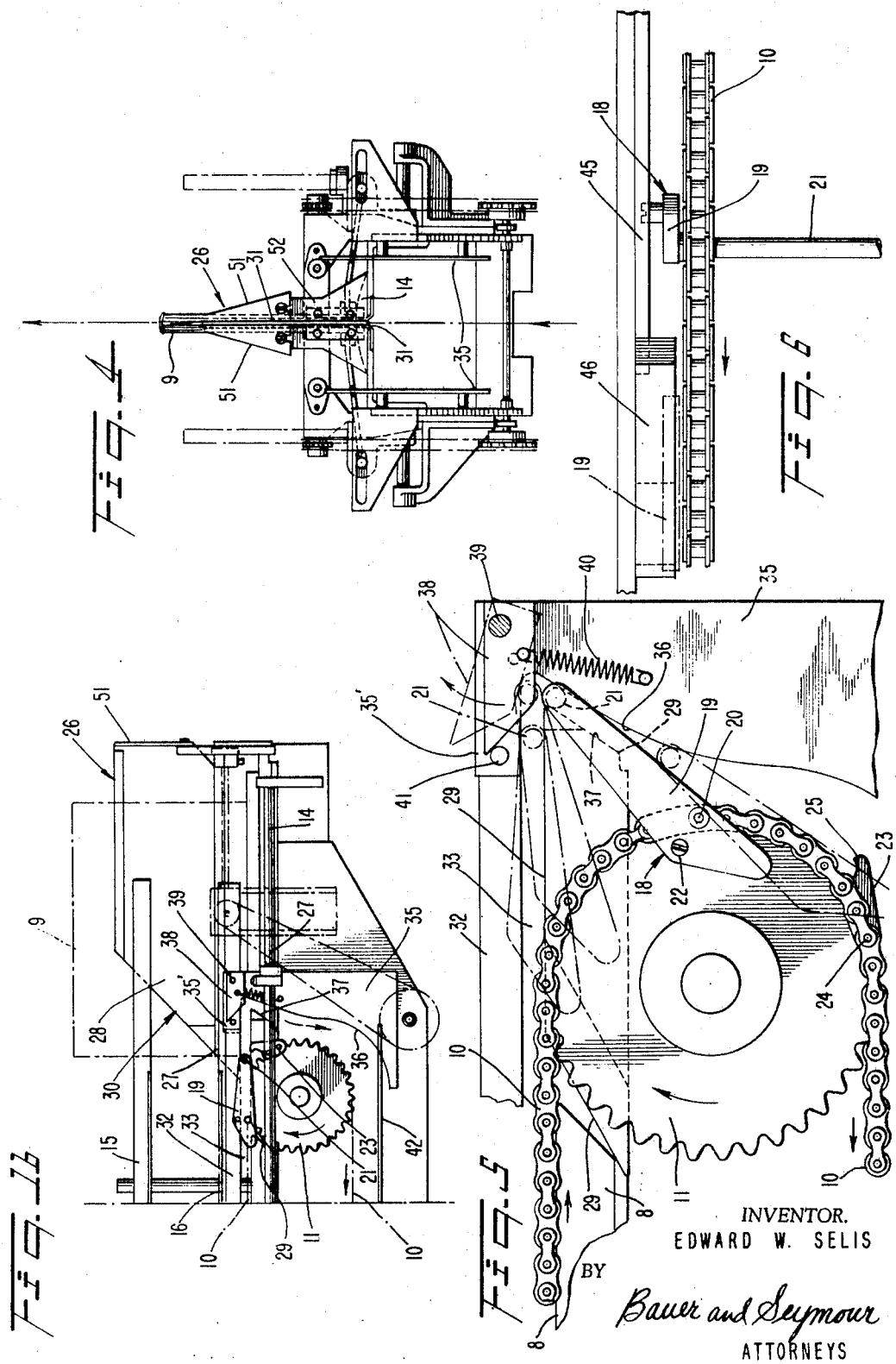

3,503,489
CONVEYOR
Edward William Selis, Allendåle, N.J., assignor to
Miehle-Goss-Dexter, Incorporated, Chicago, Ill.,
a corporation of Delaware
Filed Aug. 8, 1967, Ser. No. 659,226
Int. Cl. B65g 19/02, 19/22
U.S. Cl. 198—170                                22 Claims

ABSTRACT OF THE DISCLOSURE

Apparatus for continuously conveying book blocks to and in timed relation with the continuously operating saddle conveyor of a book casing-in machine, said apparatus comprising an endless pusher-type conveyor which pushes the book blocks into registry position for pick-up by the saddle conveyor and includes pivoted bail-type pushers and automatic hold down and control means therefor.

---

This invention relates to conveyors and more particularly to endless pusher-type conveying apparatus adapted, by way of example, for conveying books at a constant speed in rapid succession to a saddle conveyor or the like.

An object of the present invention is to provide a novel endless, pusher-type conveyor that contributes to increasing the production rate of book building equipment.

Another object is to provide novelly constructed conveyor mechanism capable of conveying books and like articles to a registry position beyond the delivery end thereof.

Still another object of the invention is to provide conveyor mechanism of the above type which is of simplified construction in comparison to prior known functionally comparable mechanisms.

A further object is to provide novel pusher means in an endless conveyor and the novel combination therewith of locking and control means therefor.

The above and further objects and novel features of the present invention will more fully appear from the following detailed description when the same is read in connection with the accompanying drawings. It is to be expressly understood, however, that the drawings are for the purpose of illustration only and are not intended as a definition of the limits of the invention.

In the drawings, wherein like reference characters refer to like parts throughout the several views, FIGS. 1a and 1b taken together constitute a somewhat schematic side elevation view of a conveyor embodying one form of the invention;

FIG. 2 is an isometric view of a bail or hoop-type pusher and hold down locking pawls therefor;

FIG. 3 is a detail top plan view illustrating the mounting of a pusher and hold-down pawls on conveyor chains;

FIG. 4 is an end elevation view of the mechanism of FIG. 1b as viewed from the right and showing a book on the splitter saddle;

FIG. 5 is an enlarged scale view of the delivery end of the conveyor as seen in FIG. 1b and showing several positions of the same pusher bail; and FIG. 6 is a detail top plan view taken on line 6—6 of FIG. 1a and illustrating means for re-setting a pusher bail.

A single exemplary embodiment of the invention is illustrated in the drawings in the form of an endless conveyor mechanism for feeding book blocks to an accurate registry position for a casing-in machine or the like. As shown, the novel conveyor mechanism comprises a duplicate pair of endless chains 10 operable in unison in spaced apart vertical planes on pairs of sprockets 11 and 12 (FIGS. 1a and 1b), either of which may be driven by suitable power means (not shown). The upper reaches of chains 10 ride on tracks or rails 8. A stationary support 14 for a book 9 or other article is disposed centrally between and somewhat below the upper reaches of chains 10. Upper and lower guides 15 and 16 are positioned to engage opposite sides of a book page block 9 supported spine up, for example, on support 14.

Books may be inserted in the guides 15, 16 onto support 14 by hand or, as an alternative, the books may be released by a timed escapement (not shown) of any known type and fed onto a short auxiliary belt conveyor 17 disposed between chains 10 and sprockets 12 at the input end of the machine and driven with said sprockets, preferably at the same speed as chains 10. Belt 17 is adapted to advance the books onto platform 14 at a position well to the right of sprockets 12 to be subsequently engaged by pusher means on chains 10 to be next described.

For sliding and advancing each book to the right as viewed in the drawings, the invention contemplates pusher means novelly combined with chains 10. As illustrated, said means comprises a series of bail or hoop-type pusher assemblies 18 equally spaced along the length of the chains. Each such pusher assembly comprises a pair of arms 19 freely, pivotally supported intermediate the ends thereof on the outside edges of chains 10 by means of pivot pins 20 which may also serve to connect adjacent links of the chains (FIGS. 2 and 3). At one end thereof arms 19 are connected by a transverse pusher bar 21 which rests upon the upper reaches of chains 10. For a purpose to appear hereinafter, each arm 19 is also provided with an outwardly projecting pin or lug 22 in spaced or eccentric relation to pivots 20.

Novel means are provided for holding rod 21 of the freely pivoted pusher assembly 18 against the upper reaches of chains 10 while said rod engages and pushes a book 9 along support 14. Said holding or locking means is adapted to automatically lock assembly 18 in position at the beginning of each cycle and release it near the delivery end of the conveyor. As illustrated, the hold-down means consists of a pawl 23 rigidly secured by two link connecting pins 24, 24 to the inner edge of each chain 10. However, only one such pawl may be sufficient. An end 25 of pawl 23 projects over and engages rod 21 while the assembly is traveling with the upper reaches of chains 10. Automatic disengagement is effected when the pawls start to pass around sprockets 11 (FIG. 1b) and re-engagement is effected while the pawls and assembly 18 are passing around sprockets 12 as will hereinafter appear.

Although a book being pushed along by a pusher assembly 18 may be delivered to many different types of stations in the present embodiment, by way of example, delivery is to a splitter saddle 26 for pickup by a saddle conveyor (not shown). The splitter saddle comprises pairs of side-by-side thin plates 27 and 28, each pair being joined together or provided with a wedge-shaped nose at the left inclined edges 30 thereof, as viewed in the drawing. Said pairs of plates 27 and 28 are so mounted and arranged as to penetrate the center of a book block below the spine thereof and provide a narrow passage 31 (FIG. 4) between the pairs of plates for the upward passage of the saddle plate of a saddle conveyor. To facilitate the splitting of the book to straddle the splitter saddle and to permit the novel control of the pusher assembly as next described, the lower left portion of plates 27 are cut away and replaced by a member 29 which is wedge shaped at its tapered left end to facilitate entry into the center of a book or page block. It is important to the succeeding operation on the book that each book be deposited on the splitter saddle 26 with trailing edge at a predetermined line of registry.

The required registry is accomplished by novel simplified means contemplated by this invention for controlling the function of the pusher assemblies 18. For this purpose, overhead guides or hold-down bars 32 are mounted to engage rod 21 and to retain the pushers 19, 21 in operative position to continue advancing the book after rod 21 is released by locking pawls 23. A space or slot 33 is formed between the upper edge of member 29 and the lower edges of plates 27, below lower surfaces of guides 32, for the passage of pusher bar 21 to push the book a desirable distance along support 14 and onto the splitter saddle to a suitable registry position thereon. To further insure proper registry of the book on the splitter saddle, adjustable stops 51 and 52 may be provided for engagement by the leading edge of the book. It will be noted that splitter member 29 also functions as a support or track for pusher rod 21 when the latter advances to the right beyond the top of sprockets 11 (FIG. 1b).

When the pivotal axis 20 of a pusher assembly 18 passes the top of sprockets 11 and moves downwardly in a curved path around the upper right quarter sector of the sprocket, it will reach a point at which pusher bar 21 will stop its advance to the right and chains 10 will begin to exert a downward and reverse pulling force as distinguished from a pushing force on the assembly (FIG. 5). To control the reverse movement of the pusher assembly during this phase of the conveyor cycle a pair of guide plates 35 depend from the forward ends of guide bars 32 and the surfaces of the left edges 36 thereof blend with the lower surfaces of guides 32 and extend downwardly to the left as best seen in FIGS. 1b and 5. The upper ends of plates 35 have arms 35' that form extensions of guide bars 32. Member 29 terminates with a beveled surface 37 parallel to surfaces 36 to permit and guide the return movement of bar 21. It will be understood that book support or platform 14 is provided with a break or slot (not shown) corresponding to the space between surfaces 36 and 37 for the downward passage of bar 21.

In order to insure against rod 21 being pulled back to the left over the top of member 29, means are provided for urging the rod downwardly after it passes the right hand end of said member. Said means, as shown, comprises a pawl 38 pivotally mounted at 39 and urged in a counterclockwise direction against a stop pin 41 by a pre-tensioned spring 40. The forward beveled edge of pawl 38 is engaged by rod 21 before the latter has completed its advance to the right and is pivoted clockwise as shown in dotted lines (FIG. 5), thus further tensioning spring 40. Thus, when reverse movement of assembly 18, 21 begins, the spring cocked pawls 38 will press rod 21 downwardly into the path between guide surfaces 36 and the beveled end of member 29 and hence through the corresponding slot in book support 14.

During a major portion of the return movement of a pusher assembly 18 to the left with the lower reaches of chains 10, it is preferable to cause bar 21 or arms 19 to follow a supporting guide 42. After bar 21 rides off the latter, the pusher assembly assisted if necessary by a spring 43, will pivot by gravity to a substantially vertical position as shown in dotted lines at 44. To reset assemblies 18 for the beginning of another cycle, as described above, the pins 22 on arms 19 of the freely dangling assembly 18 engage the lower inclined surfaces of bars or abutments 45 so that upon further travel to the left the assembly is pivoted clockwise. Upon still further movement to the left, the ends of arms 19 remote from rod 21 engage the lower inclined surfaces of blocks 46 and are cammed clockwise until bar 21 closely approaches chains 10 on sprockets 12 in position to be engaged and locked against the chains by pawls 23. After arms 19 move out of engagement with cam blocks 46, the assembly 18 is retained in position by engagement with semi-circular tracks 47 until bar 21 reaches the top of sprockets 12 when it will again be automatically clamped in position against chains 10 by locking pawls 23 and ready to engage another book page block 9 for another cycle of operation.

There is thus provided a novel, simplified endless conveyor which is self-sufficient for transferring books and the like in rapid succession and at a constant speed of travel to a registry position on a splitter saddle, said position being beyond the end of the conveyor to facilitate pick-up of the books by the vertically moving saddle plates of a saddle conveyor. Said conveyor effects transfer of books without intermittent movement and without the use of reciprocating parts. The continuous uni-directional movement of the book pushers makes it possible to decrease the spacing between books and, hence, to increase the delivery rate as compared to prior known apparatus for the same purpose.

Although only a single embodiment of the invention has been illustrated in the accompanying drawings and described in the foregoing specification it is to be expressly understood that the invention is not thus limited. As will be apparent to those skilled in the art a variety of changes may be made in the design and arrangement of the parts illustrated without departing from the spirit and scope of the invention.

What is claimed is:

1. Conveyor apparatus for books and other articles comprising a stationary platform, an endless chain on each side of said platform, pulleys for mounting said chains in parallel vertical planes, the upper reaches of said chain being in a plane above said platform, an article pusher assembly astraddle said chains and platform, said pusher assembly comprising side arms pivotally mounted on said chains with concentric pivotal axes and a cross bar adapted to rest on and move forwardly with said upper reaches in a plane adjacent the plane of said upper reaches and in advance of said pivotal axes while engaging an article to be pushed thereby along said platform, and stationary means engageable by said bar and extending forwardly beyond said upper reaches for slidably supporting said cross bar in its said plane of movement in engagement with said article beyond the delivery ends of said upper reaches of the chains, said stationary supporting means terminating at a point to permit reverse movement of the pusher assembly by the chains as said pivotal axes pass around said pulleys at said delivery ends, whereby said article is moved along the platform beyond the delivery ends of the upper reaches of said chains a distance in excess of the linear distance between said pivotal axes and said cross bar.

2. Apparatus as defined in claim 1 comprising stationary means cooperable with said supporting means to form therewith channel means for confining and guidng said bar during said forward movement of the latter beyond said delivery ends of the supper reaches of said chains.

3. Apparatus as defined in claim 2 comprising means forming channel means to receive and confine said cross bar for supporting and guiding the free end of said assembly during the initial portion of said reverse movement thereof around said delivery end pulleys.

4. Apparatus as defined in claim 3 wherein said two channel means intersect at an acute angle at the terminus of the forward movement of the cross bar by the chains.

5. Conveyor apparatus comprising endless belt means, pulleys for mounting said belt means, means for driving said belt means, pusher means pivotally mounted on said belt means, and means rigidly secured to said belt means and engagebale with said pusher means for holding the latter against pivotal movement on the belt means while the pusher means is moving with the reach of said belt means between said pulleys.

6. Apparatus as defined in claim 5 wherein said pusher means is in the form of a bail and straddles said belt means.

7. Apparatus as defined in claim 6 comprising means extending forwardly beyond and in general alignment with the upper reach of said belt means for supporting the closed leading end of said bail until movement thereof by the belt means is reversed.

8. Apparatus as defined in claim 7 wherein said belt means comprises a link chain, said pulleys are sprockets and said holding means is a pawl engageable with the free end of the pusher means to hold the latter in engagement with the chain.

9. Apparatus as defined in claim 8 wherein said pawl is secured to said chain a plurality of links in advance of the pivotal axis of the pusher means.

10. Apparatus as defined in claim 5 wherein said holding means is adapted to automatically release said pusher means during the initial movement of the holding means around a said pulley.

11. Apparatus as defined in claim 10 wherein said holding means is adapted to automatically capture said pusher means during the final movement of said holding means around a said pulley.

12. Apparatus as defined in claim 11 comprising means for pivoting said pusher means into position for capture by said holding means as the same move together around a said pulley.

13. Apparatus as defined in claim 5 wherein said pusher means comprises transverse bar means and said holding means comprises one or more pawls engageable with said bar means to hold the latter against said belt means.

14. Conveyor apparatus comprising a pair of axially spaced coaxial receiving-end pulleys, a pair of axially spaced coaxial delivery-end pulleys, an endless belt mounted on each set of corresponding pulleys of said pairs, said belts having upper and lower horizontal reaches between pulleys, means for driving said belts continuously in one direction, a platform between said belts below the plane of the upper reaches thereof for supporting an article, a bail-shaped pusher having side arms and a transverse bar pivotally mounted on said belts so that said arms extend forwardly from the pivotal axis in the direction of movement of the upper reaches of the belts, and means for holding said bar adjacent the plane of the upper reaches of the belts to engage an article on said platform during movement by said upper reaches, said last-named means including support means for said bar extending beyond said upper reaches at the delivery-end pulleys a distance approximating the distance between said pivotal axis and said bar.

15. Apparatus as defined in claim 14 comprising spring-loaded means for urging said bar downwardly at the end of its forward movement beyond the end of said support means.

16. Apparatus as defined in claim 14 comprising guide means for supporting the free end of said pusher during reverse movement thereof around said delivery-end pulleys.

17. Apparatus as defined in claim 14 comprising means responsive to movement of said pusher with the lower reaches of said belts to effect pivotal movement of the pusher to a position wherein said bar is adjacent the belts in advance of said pivotal axis.

18. Apparatus as defined in claim 17 comprising guide means for maintaining the pusher in said position during movement thereof around said receiving-end pulleys.

19. Apparatus as defined in claim 14 wherein said means for holding the bar comprises means rigidly secured to a said belt for holding said bar for movement away from the upper reach of the belts and for releasing said bar as the latter passes through the vertical plane containing the axis of said delivery-end pulleys.

20. Conveyor apparatus for books and other articles comprising a stationary platform, and endless chain on each side of said platform, pulleys for mounting said chains in parallel vertical planes, the upper reaches of said chains being in a plane above said platform, an article pusher assembly astraddle said chains and platform, said pusher assembly comprising side arms pivotally mounted on said chains with concentric pivotal axes and a cross bar adapted to rest on the upper reaches of said chains in advance of said pivotal axes and to engage an article to be pushed along said platform, clamping means rigidly secured to a said chain and engageable with said cross bar for limiting pivotal movement of said assembly while the same is moving with the upper reaches of said chains, and means for supporting said cross bar in engagement with an article beyond the delivery ends of said chains, said last-named means terminating at a point to permit reverse movement of the pusher assembly by the chains as said pivotal axes pass around said pulleys at said delivery ends, whereby said article is moved along the platform beyond the delivery ends of the upper reaches of said chains a distance in excess of the linear distance between said pivotal axes and said cross bar.

21. Apparatus as defined in claim 20 wherein said clamping means is a pawl engageable with the cross bar to hold the latter in engagement with said chains.

22. Book fabricating equipment comprising a platform for supporting the page blocks of books on edge, a splitter saddle at the delivery end of said platform in the center of the path of said page blocks, a continuously moving endless conveyor comprising endless belt members and pusher means pivotally mounted on said members for successively moving said page blocks into a final predetermined registry position on said splitter saddle for pick up by a saddle conveyor, the trailing edge of a page block in said registry position being in a vertical plane spaced an appreciable distance beyond the endless belt members of the conveyor in the direction of page block movement, and means carried by said members for holding said pusher means against appreciable pivotal movement on said members while the pusher means engage a page block to move the same to said registry position.

References Cited

UNITED STATES PATENTS

| | | | |
|---|---|---|---|
| 1,787,383 | 12/1930 | Lacy | 198—133 |
| 2,652,915 | 9/1953 | Fox | 190—170 |
| 2,546,072 | 3/1951 | Kemp | 198—170 |
| 2,780,343 | 2/1957 | Bunnell | 198—170 |

RICHARD E. AEGERTER, Primary Examiner

U.S. Cl. X,R,

198—133

PO-1050
(5/69)

UNITED STATES PATENT OFFICE
CERTIFICATE OF CORRECTION

Patent No. 3,503,489  Dated March 31, 1970

Inventor(s) Edward W. Selis

It is certified that error appears in the above-identified patent and that said Letters Patent are hereby corrected as shown below:

Column 5, line 1, the claim reference numeral "7" should read -- 5 --.

NOV. 17, 1970

(SEAL)
Attest:

Edward M. Fletcher, Jr.
Attesting Officer

WILLIAM E. SCHUYLER, JR.
Commissioner of Patents